(12) United States Patent
Lia et al.

(10) Patent No.: US 8,248,446 B2
(45) Date of Patent: Aug. 21, 2012

(54) RICH MEDIA COMMUNICATION CLIENT DEVICE, METHOD AND COMPUTER PROGRAM PRODUCT

(75) Inventors: Tom Erik Lia, Askim (NO); Andreas Eide, Oslo (NO); Michel Sagen, Hosle (NO)

(73) Assignee: Cisco Technology, Inc., San Jose, CA (US)

( * ) Notice: Subject to any disclaimer, the term of this patent is extended or adjusted under 35 U.S.C. 154(b) by 1445 days.

(21) Appl. No.: 11/774,196

(22) Filed: Jul. 6, 2007

(65) Prior Publication Data

US 2008/0043091 A1 Feb. 21, 2008

Related U.S. Application Data

(60) Provisional application No. 60/818,920, filed on Jul. 6, 2006.

(30) Foreign Application Priority Data

Jul. 6, 2006 (NO) .................................. 20063143

(51) Int. Cl.
*H04M 11/00* (2006.01)
(52) U.S. Cl. .................................... 348/14.01; 725/106
(58) Field of Classification Search .... 348/14.01–14.09; 725/96, 106; 709/204; 715/753; 379/202.01
See application file for complete search history.

(56) References Cited

U.S. PATENT DOCUMENTS

| | | | |
|---|---|---|---|
| 6,418,214 B1* | 7/2002 | Smythe et al. ........... | 379/202.01 |
| 2002/0066109 A1* | 5/2002 | Tam et al. .................. | 725/106 |
| 2002/0118809 A1 | 8/2002 | Eisenberg | |
| 2004/0008635 A1 | 1/2004 | Nelson et al. | |
| 2004/0098456 A1 | 5/2004 | Krzyzanowski et al. | |
| 2005/0080850 A1 | 4/2005 | Salesky et al. | |
| 2005/0128285 A1 | 6/2005 | Berenguer | |
| 2005/0264648 A1 | 12/2005 | Ivashin et al. | |
| 2006/0047749 A1 | 3/2006 | Davis et al. | |
| 2008/0065996 A1* | 3/2008 | Noel et al. ................. | 715/753 |

FOREIGN PATENT DOCUMENTS

EP 1 381 237 A2 5/2003

OTHER PUBLICATIONS

Extended European Search Report issued Nov. 17, 2010 in EP 07 79 3897.

* cited by examiner

*Primary Examiner* — Curtis Kuntz
*Assistant Examiner* — Maria El-Zoobi
(74) *Attorney, Agent, or Firm* — Oblon, Spivak, McClelland, Maier & Neustadt, L.L.P.

(57) ABSTRACT

A method, computer program product, and system for initiating, routing and scheduling video conferences. A dial URL is introduced with a prefix unique for calling purposes. When a user activates such an URL in his web browser, a content handler associated with the browser will recognize the type of URL and send a request to a managing tool to determine an available calling route between the user's preferred end-point and the end-point being addressed in the URL with the required resources. The managing tool then schedules the resources and initiates the call between the end-points, thereby allowing for a one-click initiation of ad-hoc video calls and video conferences.

12 Claims, 4 Drawing Sheets

RICH MEDIA COMMUNICATION CLIENT DEVICE, METHOD AND COMPUTER PROGRAM PRODUCT

CROSS REFERENCE TO RELATED APPLICATIONS

The present application claims priority to U.S. provisional application 60/818,920 filed on Jul. 6, 2006 and Norwegian application NO 20063143 filed on Jul. 6, 2006, the entire contents of both being incorporated herein by reference.

BACKGROUND OF THE INVENTION

1. Field of the Invention

The present invention relates to initiating, routing and scheduling conferences.

2. Background of the Invention

Conventional conferencing systems comprise a number of end-points communicating real-time video, audio and/or data streams over and between various networks such as WAN, LAN and circuit switched networks.

A number of conference systems residing at different sites may participate in the same conference, most often, through one or more MCU's (Multipoint Control Unit) performing switching functions to allow the audiovisual terminals to intercommunicate properly.

Video conferencing has been utilized for many years mostly on separated terminals with hardware and software tailored for videoconferencing. However, in recent years, video conferencing from a computer terminal or through a computer network has become feasible. The computer terminal is, for example, a personal computer having a camera and a microphone. The computer network can among others be a Local Area Network (LAN), a Public Switched Telephone Network (PSTN), or the Internet. Video conferencing requires a large amount of bandwidth and processing power and often quality levels of audio, video and data are not able to be maintained at high levels due to limitations on bandwidth and processing power. These limitations may originate from the computer network or the computer terminals.

Current video conferencing standards, usually separate a conference into streams for audio, video and data. The two standards that traditionally has been employed in video conferencing are: (1) ITU-T Recommendation H.320 (1996) Narrow-band visual telephone systems and terminal equipment and (2) ITU-T Recommendation H.323 (1997) Packet-based multimedia communications systems, both of which are hereby incorporated by reference.

A third standard, the Session Initiation Protocol (SIP) has traditionally had a profound impact on the voice world, and it is beginning to influence the video world as well. SIP provides signaling and call control means that are especially designed for the delivery of 'advanced' features such as IM, multimedia sessions (voice, video, IM, web conference . . . ), and presence. SIP interoperability promises to reduce the cost of telecommunication products and services as these devices and services promulgate from the realm of the vendors into products and services used by enterprises and consumers.

Desktop video has traditionally been run on a PC by launching a separate application designed for video only. In a video telephony environment, video is one of several communication medias users can take advantage of from a common, well-designed user interface. Furthermore, many soft client manufacturers are providing APIs that will allow video, voice, and the other communications mechanisms to be integrated into everyday workflow applications like Outlook, Microsoft Office Suite, CRM applications, ERP applications, etc. Video telephony is really less about making a video call and more about improving the ability to communicate at a distance in whatever workflow environment a user may be in.

Video-enabled soft clients running on a PC are required to perform significant processing in order to compress video images into data streams that can be effectively transmitted over the network. New, powerful PCs are available at a reasonable price that can take advantage of the latest video compression algorithms. The most common standards for video compression are H.263 and H.264. While both require significant processing power, H.264 is able to provide an image equivalent to H.263 but at roughly half the bandwidth. To achieve this level of compression, H.264 requires more processing power than does H.263. PCs are now available that can perform the processing needed to compress H.264 video streams.

In addition to more powerful computers and more effective compression techniques, another trend that has boosted deployment of desktop video is the development of low-priced web-cams of a relatively high quality. Also, it has become more common for computers to have integrated web-cams as well as microphones.

SUMMARY OF THE INVENTION

It is an object of the present invention to provide a method computer program product and system avoiding the above described problems by allowing a client without a video conference software module to download such a module after being invited to participate in a video conference.

BRIEF DESCRIPTION OF THE DRAWINGS

In order to make the invention more readily understandable, the discussion that follows will be supported by the following drawings.

DETAILED DESCRIPTION OF THE PRESENT INVENTION

In the following, the present invention will be discussed by describing an embodiment, supported by the accompanying drawings. However, people skilled in the art will realize other applications and modifications within the scope of the invention as defined in the enclosed independent claims.

One idea of the present invention is to provide a system and a method allowing a user to make a video call or a video conference from a desktop only by clicking on a link, regardless of whether the user has preinstalled a PC-client for video calls or not. A typical user scenario provided by the present invention would be that a desktop user invites another user to a video call by sending an e-mail including a video call link When the invited party clicks on the link, a video call is automatically established between the respective desktops of the parties, or alternatively between several parties in a video conference. Another possible user scenario would be a partner or a customer portal including a call link making e.g.

helpdesk or a customer centre available through a video call from the user's desktop only by clicking on the link.

In particular, the present invention discloses a method and a system for installing and using a video software desktop client. The system includes several network and software components, but first of all a client/server interaction with a SIP server to provide easy-to-deploy and easy-to-use video clients on any kind of web browsers installed on a desktop.

Figure 1:
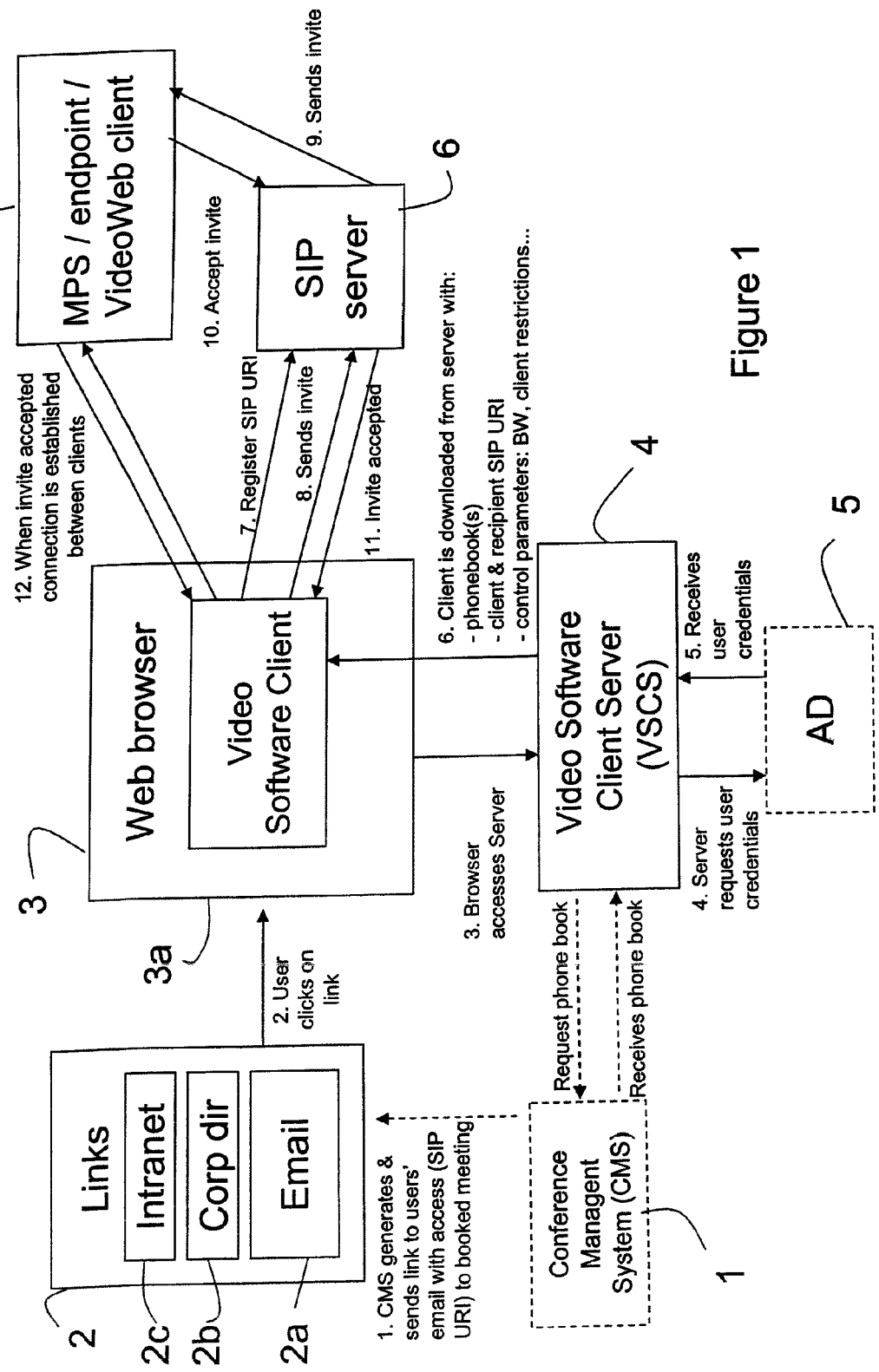
FIG. 1 is a system block diagram according to one embodiment of the present invention.

FIG. 1 shows the architecture of a system according to one embodiment of the present invention in addition to an example of the data flow between the components included in the architecture. The purpose of the system and the data flow is to automatically install the software client on the desktop, and thereafter enable an automatic call set-up when a user clicks on a link that has been generated by the system.

The first step in a typical scenario of the system according to the present invention will be the provision of a URI to the user. A Uniform Resource Identifier (URI) is a compact string of characters for identifying an abstract or physical resource. The URI will typically be accompanied by an invitation to a video call or conference e.g. included in an e-mail. The URI could be generated by a conference management system, which is typically a part of a video conferencing infrastructure. A conference management system provide system and resource overview, allowing users to create, edit, and delete reservations, reserve resources for dial-in participants and specify bandwidth and network settings. Thus, a conference management system is well suited for generating a URI referring to a scheduled conference or an address to a terminal for an ad hoc peer-to-peer conference, in addition to a reference to a downloadable software package, which will be discussed later.

Conventionally, when clicking on a link in a web browser, a content handler is requested to analyze the URI to determine the characteristics of the link, and initiate further actions according to the content. According to the present invention, when the user clicks at the URI provided by the management system, the desktop browser accesses a video software client server (VSCS). The VSCS then makes an inquiry in a client database to determine whether the terminal from which the request originates is already included in the database. If it is, the credentials of the desktop e.g stored in the database are captured. If it is not, a video software client is downloaded and installed in the desktop, preferably accompanied with capturing essential characteristics and identifications of that specific desktop client that is being stored in the database. Optionally, a phonebook captured from the Conference Management System could also be downloaded to the desktop client. In any case, a SIP URI of both the desktop client and the recipient of the call or the conference are provided to the desktop client.

When the video client is installed and/or the required SIP URIs are provided, a SIP call between the parties involved is initiated. When initiating a SIP call, a "SIP register" message is first transmitted to a SIP server. When the "SIP register" message is acknowledged from the SIP server, a SIP invite message containing the unique application id, which in this case is a video call, and the SIP URI of both the inviter and the invitee are transmitted to the SIP server. The invitation is forwarded from the SIP server to the invitee in another SIP invite message. If the invitee accepts the invitation, a SIP accept message is returned to the SIP server, and an acknowledge message is transmitted to the desktop client. The invitee could be an MCU setting up a multipart conference, or a single desktop software client or a conventional conference terminal.

For allowing a software video client to be installed on a desktop, an ActiveX component is preferably activated in the desktop web browser. ActiveX generally is a distributed object system and protocol. ActiveX allows an editor to "farm out" part of a web browser to another editor and then re-import it. Its primary use is for managing compound documents, but it is also used for transferring data between different applications using drag and drop and clipboard operations. The concept of "embedding" is also applicable when using multimedia in Web pages, as video, animation (include Flash animations), and when music files are embedded within the HTML code.

The tasks of the ActiveX component that preferably should be used in connection with the present invention is e.g. receiving and initiating SIP calls displaying video, playing audio, and enforcing possible licensing policies, receiving and transmitting SIP URIs (own and caller's) as well as handling SIP messages, and managing bandwidth restrictions. Other tools, such as Java, which is adapted for installation and running applications on computers could also be used for implementation of the present invention, instead of ActiveX.

Turning now to the drawings, FIG. 1 is an overall architecture according to one embodiment of the invention. A client (not shown) schedules a video meeting with a Conference Management System (CMS) 1. The CMS generates and sends a link 2 to the invitees' email address with access information (e.g., a SIP URI) for the booked meeting. The access information may include an email address 2a, a link to a corporate address 2b, or an intranet address 2c. The user clicks on the link from within their web browser 3. The browser 3 determines whether the video client software 3a is already installed. The browser also accesses the video software client server (VSCS) 4 to confirm the installed video client software 3a is registered and, if necessary, a copy of the client 3a. In checking the registration information, the VSCS 4 requests and receives user credentials from an active directory (AD) 5. Optionally, the VSCS 4 requests and receives phone book information from the CMS 1. If the client 3a is downloaded, phonebook information, client and recipient SIP address information and various control parameters (e.g., bandwidth, time restrictions, number of call restrictions, maximum frame rate, maximum picture resolution, software version, video and audio coding standard capabilities, processing and storing capabilities and computer type, etc). Once the client 3a is either downloaded and/or the client's 3a registration status is confirmed, the client 3a establishes a video conference link at the appointed time via SIP server 6. That is, the client 3a registers with a SIP server 6 and then sends a SIP invitation to multipoint control server (MCS)/another endpoint/client 7 via the SIP server 6. Once the SIP invitation is accepted, the client 3a and the MCS/other endpoint/client 7 establish audio and video communications.

Figure 2:
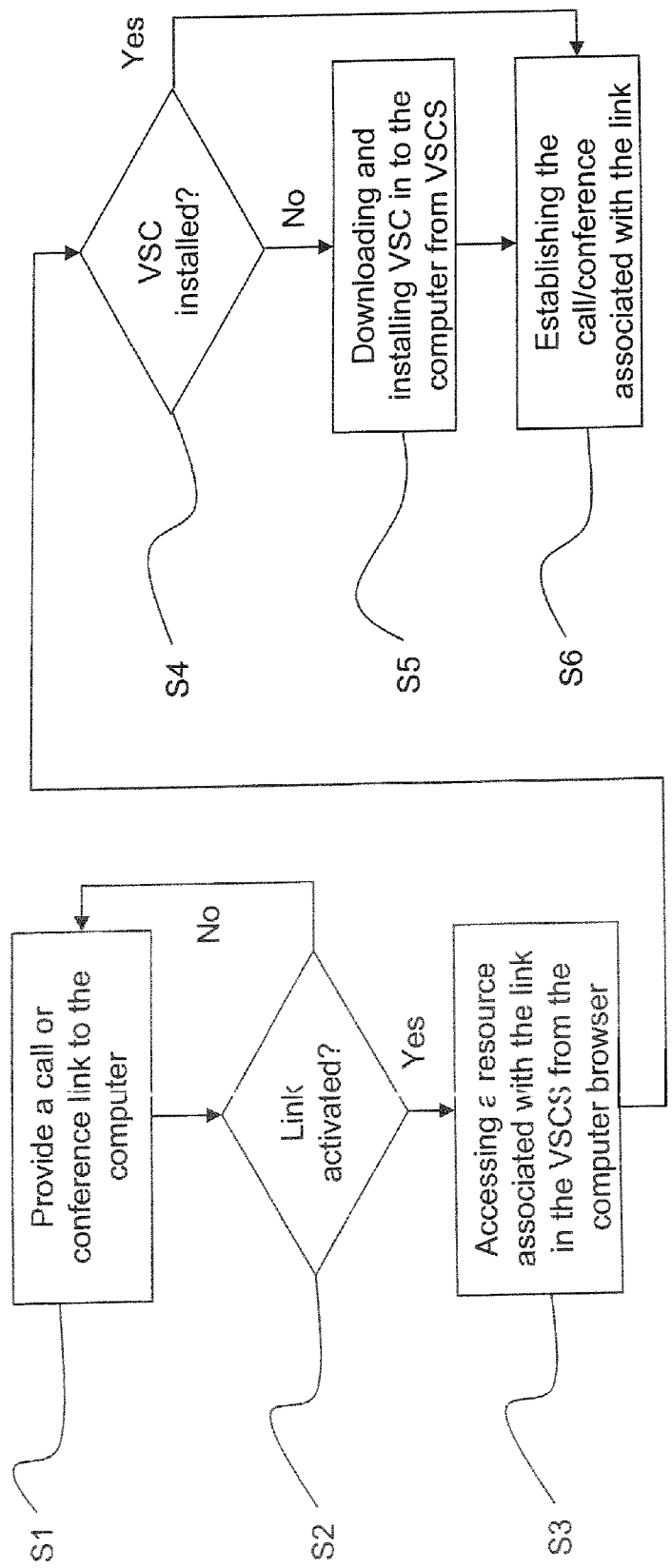
FIG. 2 is a flow sheet illustrating the steps of a method according to one aspect of the present invention.

FIG. 2 shows a flow chart according to one embodiment of the invention. The process begins in step S1 where a call or conference link is provided to the computer. In step S2, link activation is determined. In step S3, a resource associated with the link in the VSCS is activated from the computer browser. In step S4, installation of the video client software is determined. If not, in step S5, the video client software is downloaded. Ultimately, in step S6, the video conference is initiated.

Figure 3:
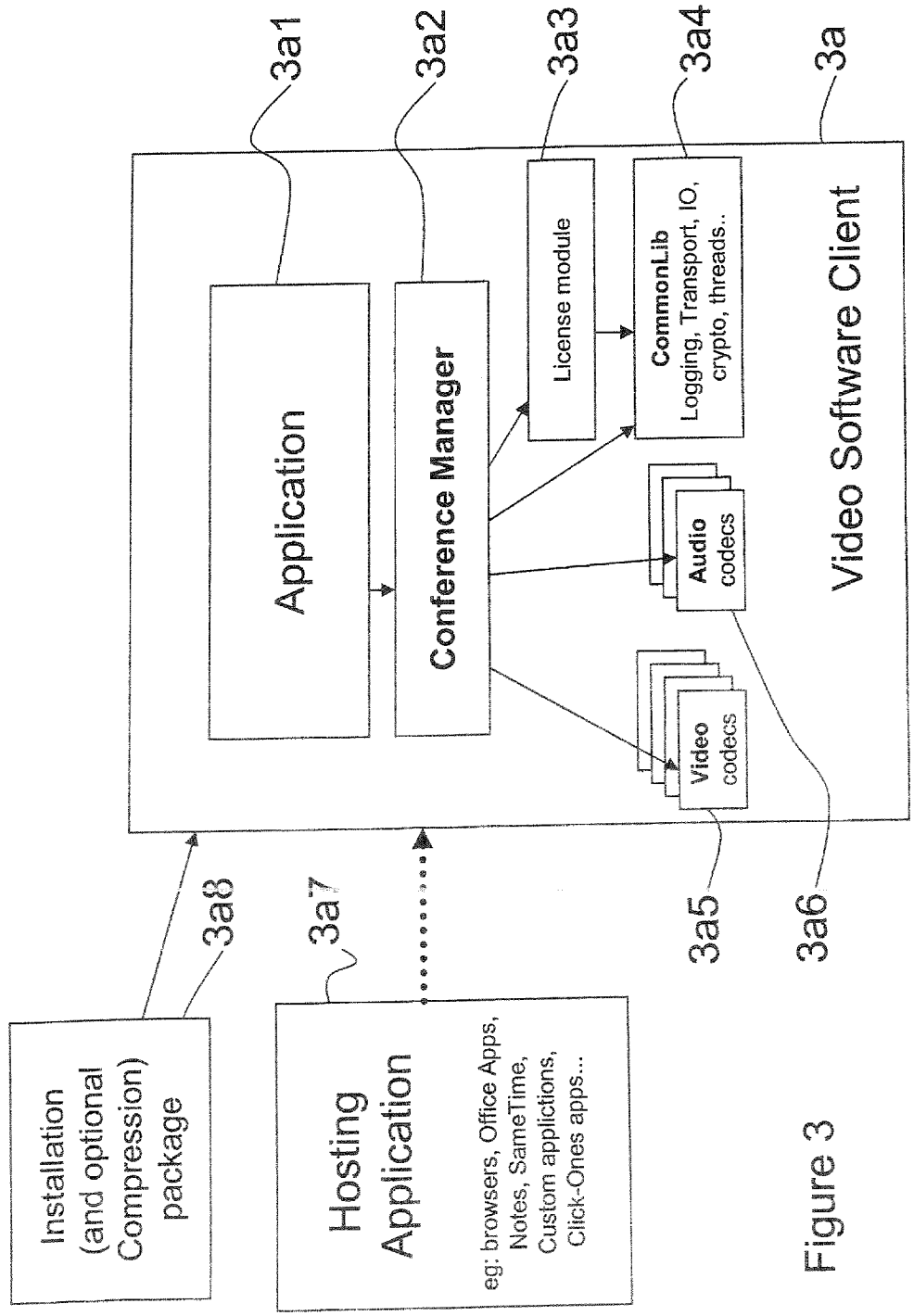
FIG. 3 is a block diagram of a video client software package of one embodiment of the invention.

FIG. 3 is a block diagram of the client 3a that is downloaded. The client includes an overarching application module 3a1 that exposes the external interfaces used by the host. Application module 3a1 uses internal interfaces of the conference manager module 3a2 to realize the implementation. Thus, it easy to expose different external interfaces satisfying different implementations of the dynamic link library; the application layer. Conference manager module 3a2 includes interfaces to a license module 3a3, common libraries 3a4, a video codec(s) 3a5, and an audio codec(s) 3a6. The client 3a interfaces with a hosting application 3a7, which may include any one of a number of commercial or proprietary browsers, the IBM SAMETIME application, custom applications, etc. Also, the client may be compressed within a compression package included within an installation package 3a8.

Figure 4:
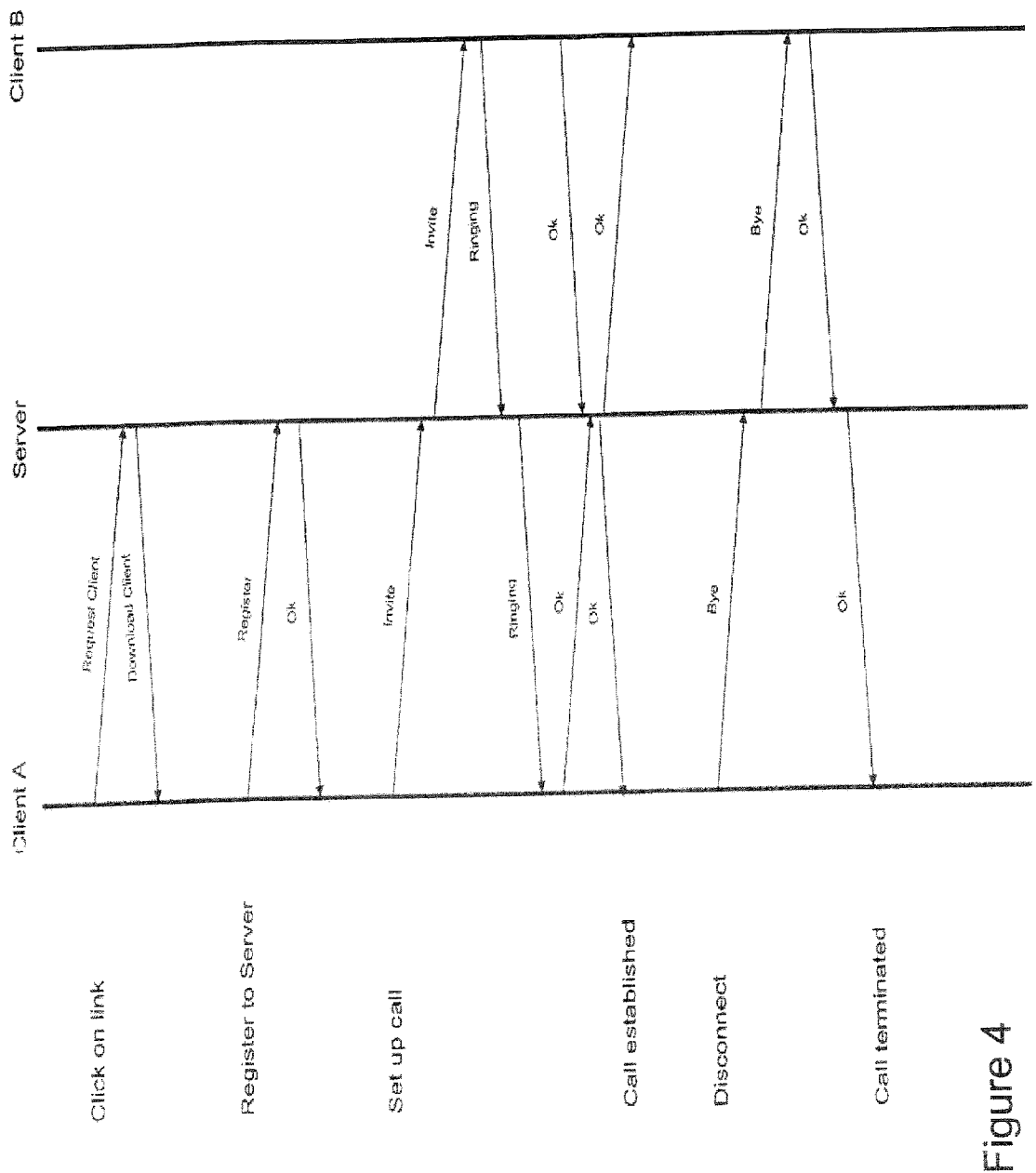
FIG. 4 is a timing diagram according to one embodiment of the invention.

FIG. 4 is a timing chart according to one embodiment of the invention. After receiving an email or other electronic invitation with an embedded link to a video conference, the user clicks on the link. Client A determines whether or not the client software 3a is already installed. Alternatively, client A may request the client software 3a in anticipation of a future video conference. Upon determining that the client software 3a is not installed, client A requests that VSCS 4 provide a copy of the client software 3a. This request may be initiated manually, or may be initiated automatically, either immediately or in accordance with a schedule. The client software 3a is provided by the VSCS 4. Upon immediate receipt of the client software 3a, or later, client A registers the downloaded client software 3a with the VSCS 4.

Near to the time when the conference starts, client A sets up the call via the server by sending a SIP invitation to client B. Client B responds with a ringing indication, and the call is established, disconnected and terminated in accordance with SIP procedures.

In this embodiment, Client B is presumed to already have installed the client 3a or to be a conventional video conference endpoint or multipoint control unit. However, in an alternative embodiment not shown in FIG. 4, Client B may a desktop video conference system that does not have client software 3a installed. (Perhaps, client B did not receive the original message with the link and information about the conference call, or perhaps the license of the client software 3a held by client B expired between the time that the invitation was sent and when the conference was to be initiated.) In this scenario, upon receiving the SIP invite, the software in client B recognizes that client software 3a is missing or expired. Then, prior to sending a ringing signal, client B requests a download of the client software 3a or a renewal of the license. Once client B is registered/re-registered with the VSCS 4, client B proceeds with the call set up.

Video codec(s) 3a5 may be compliant with G.711, G.722 or another commercial or proprietary video standard. Audio codec(s) 3a6 may be compliant with H.263, H.264 or another commercial or proprietary audio standard. The client software 3a may include echo control software and/or bandwidth control software (e.g., to enable variable data rates to and from other endpoints in accordance with capability). The client software 3a may include server administrative information to allow for registration, and may include license information. The client software 3a may include an interface to an enterprise conference scheduling software and device so as to allow for automatic polling of capabilities and pushing of alerts and client software in accordance with a conference schedule. The client software 3a is crafted to interface with any commercial or proprietary platform (e.g., WINDOWS, MAC OS, LINUX) and browser software. The client software 3a may include firewall traversal software to enable downloading of the client software 3a across various security/access domains. The client software 3a may include encryption and decryption features so that some or all of the software may be decrypted during or after downloading. The client software 3a may be interfaced to the IBM SAMETIME application, and may be compatible with SNMP. The client software 3a may also support video presentations and slide shows, which may or may not include audio. The client software 3a may include server redundancy, load balancing and port range features to enable multiple VSCS 4 or SIP servers 6 to balance throughput without disrupting conference communications. The client software 3a may include a recording function as well as a call admission control function.

In another embodiment the caller is known to the VSCS that serves an organization. The VSCS gives access to one or more phonebooks. It may also have authentication mechanisms as commonly used for extranets and Virtual Private Networks. There is a profile associated to the caller, or the caller belongs to a group of callers, with specified rights, e.g. "phonebook can be downloaded" or "phonebook can be accessed while connected to this VSCS". The profile can also include permissions to make calls. In addition other permissions could be given, like permission to call one or more persons in the organization and using an MCU to create a multiparty conference, using the phonebook. Additionally the internal receiver of a call, may give or change the callers permissions with the VSCS, either for a specified or indefinite period, thus in effect making that caller part of the organizations internal video conferencing network that is managed by the Conference Management System.

The previously described process may be encoded in software on a computer readable medium including a compact disk, memory device, flash memory or any other computer readable physical medium. The software is configured to cause a processor-based device to carry out one or more of the steps described above regarding rich media communications. Computer operations are described in "How Computers Work, Millennium Edition," by Ron White, Que Publications, 1999, the entire contents of which being incorporated herein by reference.

The invention claimed is:

1. A method for enabling a network connected computer to participate in a call or a conference between one or more video conference terminals, comprising:
   receiving at the network connected computer a browser activatable link that includes embedded therein a uniform resource identifier, said link providing access to a conference call,
   accessing a Video Software Client Server (VSCS), via the uniform resource identifier, from the browser of the network connected computer when said link is activated by said browser,
   determining, with the browser of the network connected computer, whether a Video Software Client (VSC) is already installed in the network connected computer in response to said link being activated by said browser,
   if said browser determines that said VSC is not downloaded, downloading said VSC from said VSCS to the network connected computer and installing the VSC therein,
   after the VSC is downloaded, initiating a conference call using the VSC between said network connected computer and the one or more video terminals, and
   downloading from the VSCS, to the network connected computer, SIP (session initiation protocol) URI's (universal resource indicators) of the VSC installed in the network connected computer and the one or more video conference terminals, in addition to control parameters associated with the conference call.

2. The method according to claim 1, further comprising: establishing a SIP call or a SIP conference between said VSC installed in the network connected computer and the one or more video conference terminals through a SIP server by using said SIP URI's downloaded from the VSCS.

3. The method according to claim 1, wherein said control parameters are bandwidth restrictions and VSC restrictions, which include maximum frame rate, maximum picture resolution, software version, video and audio coding standard capabilities, processing and storing capabilities and computer type.

4. The method according to claim 1, wherein said link is provided from a Conference Management System (CMS) and is associated with a CMS scheduled conference between the network connected computer and the one or more video conference terminals, or a unique identification of the one or more video terminals, respectively.

5. The method according to claim 4, wherein said CMS schedules the conference call, which includes establishing resource allocations and communication routes for the conference call between the network connected computer and the one or more video conference terminals.

6. An apparatus configured to enable a network connected computer to participate in a call or a conference between one or more video conference terminals, comprising:
a Video Software Client Server (VSCS) accessible from a browser on the network connected computer through a browser activatable link that includes embedded therein a uniform resource identifier of the VSCS, said link providing access to a conference call,
wherein the VSCS is configured to provide a Video Software Client (VSC) configured to establish a video call from to the network connected computer in response to the link being activated by said browser and said browser determining that the VSC is not installed on the network connected computer,
the browser installs the VSC in the network connected computer if said VSC is not already installed in the network connected computer, and
the browser imitates the a conference call between said VSC installed in the network connected computer and the one or more video terminals,
wherein said VSC is further configured to download from the VSCS to the network connected computer SIP (session initiation protocol) URI's (universal resource indicators) of the VSC installed in the network connected computer and the one more video conference terminals, in addition to control parameters associated with the conference call.

7. The system according to claim 6, further comprising:
a Conference Management System (CMS) configured to provide said link, or a unique identification of the one or more video terminals, respectively.

8. The system according to claim 7, wherein said CMS schedules the conference call, which includes resource allocations and communication routes for establishing the conference call between the network connected computer and the one or more video conference terminals.

9. The system according to claim 6, further comprising:
a SIP server through which a SIP call or a SIP conference between said VSC installed in the network connected computer and the one or more video terminals is established by using said SIP URI's downloaded from the VSCS.

10. The system according to claim 6, wherein said control parameters are bandwidth restrictions and VSC restrictions.

11. A non-transitory computer readable medium storing instructions, which when executed by a networked computer causes the network connected computer to execute a method for setting up the network connected computer to participate in a conference call between one ore more video conference terminals, said method comprising:
receiving at the network connected computer a browser activatable link that includes embedded therein a uniform resource identifier, said link providing access to a conference call,
accessing a Video Software Client Server (VSCS), via the uniform resource identifier, from the browser of the network connected computer when said link is activated by said browser,
determining, with the browser of the network connected computer, whether a Video Software Client (VSC) is already installed in the network connected computer in response to said link being activated by said browser,
if said browser determines that said VSC is not downloaded, downloading said VSC from said VSCS to the network connected computer and installing the VSC therein,
after the VSC is downloaded, initiating a conference call using the VSC between said network connected computer and the one or more video terminals, and
downloading from the VSCS, to the network connected computer, SIP (session initiation protocol) URI's (universal resource indicators) of the VSC installed in the network connected computer and the one or more video conference terminals, in addition to control parameters associated with the conference call.

12. The method according to claim 1, wherein the receiving includes receiving the link in an email.

\* \* \* \* \*